Dec. 13, 1955  J. D. ADKINS ET AL  2,727,224
SWEEP CONTROL CIRCUIT FOR CATHODE RAY TUBE INDICATORS
Filed July 22, 1948
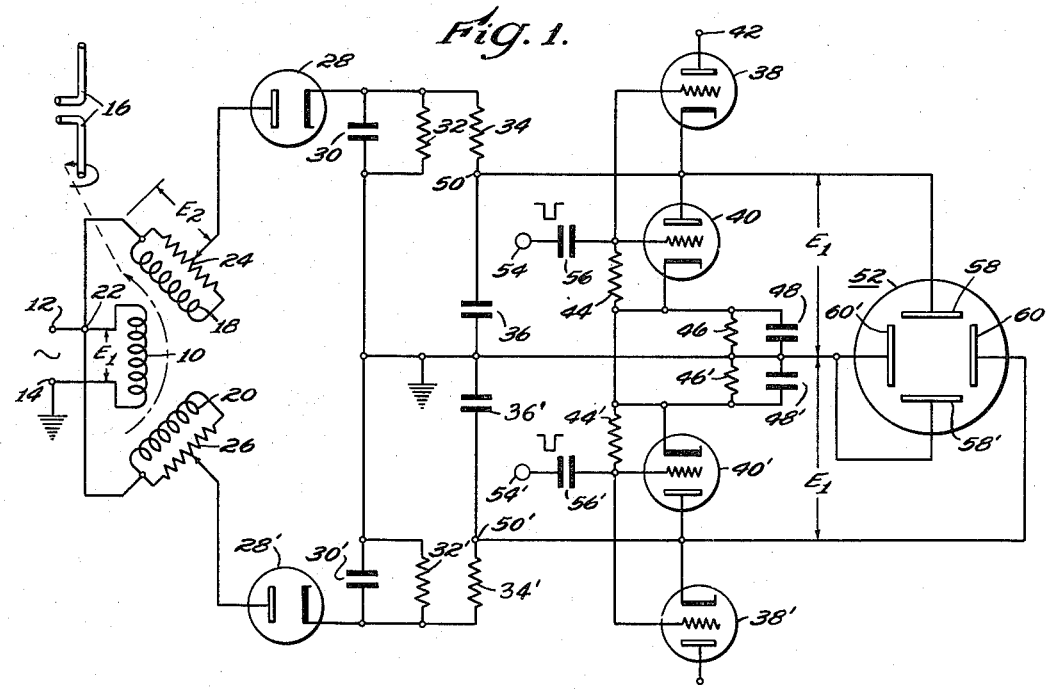
Fig. 1.
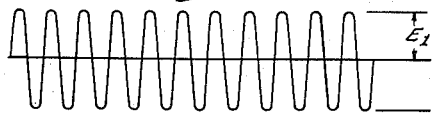
Fig. 2.
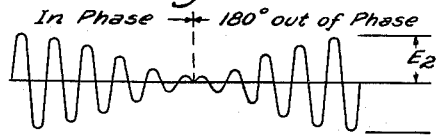
Fig. 3.
In Phase — 180° out of Phase
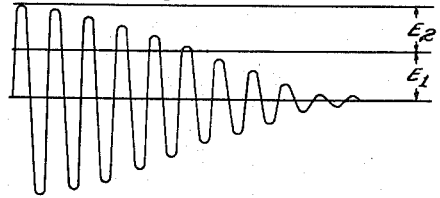
Fig. 4.
Fig. 5.
Fig. 6.
WITNESSES:
Robert C. Baird
Wm. C. Groome
INVENTORS
John D. Adkins and
Hagan L. Jackson.
BY
F. E. Browder
ATTORNEY United States Patent Office 2,727,224
Patented Dec. 13, 1955

2,727,224

SWEEP CONTROL CIRCUIT FOR CATHODE RAY TUBE INDICATORS

John D. Adkins, Glen Burnie, and Hagan Lanon Jackson, Baltimore, Md., assignors to Westinghouse Electric Corporation, East Pittsburgh, Pa., a corporation of Pennsylvania Application July 22, 1948, Serial No. 40,094

5 Claims. (Cl. 340—207)

This invention pertains to the field of high frequency radio systems such as are used for object detection and ranging, and particularly to improvements in the control circuits of indicating apparatus used therewith for displaying the information obtained by such systems.

More specifically, the invention relates to improvements in the sweep control circuits of display systems of the plan position indicator (P. P. I.) type, which generally utilize a cathode ray tube as the indicating element, and which operate to display a polar map of the surroundings scanned by the high-frequency radio system.

It is a principal object of the present invention to provide a cathode ray tube sweep control circuit of relatively simple form, and which is peculiarly adapted for the control of cathode ray tubes of the electrostatic deflection type. The simplicity of the device, as well as the fact that it enables the use of an electrostatically controlled display tube which is inherently less bulky and heavy than the usual magnetically controlled tubes heretofore used for P. P. I. purposes, particularly adapts the invention to the purposes of airborne radar, where simplicity and small size and weight are primary considerations.

It is a further object of the invention to provide a control circuit of the kind mentioned, which eliminates the passing of the control currents through inductive circuits, whereby wave form distortion and non-linearity of the sweep are kept to a minimum. A further object of the invention is to provide such a circuit which will eliminate the need for transmitting the sweep voltage or current over long coaxial cables from the sweep generator to the rotary transformer at the antenna, and back, thereby achieving a further simplification and further reducing size, weight and cost.

As an aid to the understanding of the present invention, the general type of plan position indicating radar system may be described as comprising a high frequency radio transmitter fitted with an antenna capable of directing a relatively narrow scanning beam of energy in a circular path about the antenna as a center, together with a receiving system adapted to receive any of the transmitted energy which is reflected by external objects. The display system associated with the energy receiver comprises a cathode ray tube whose electron stream, and hence the luminous spot produced on the fluorescent screen, is capable of being deflected at a uniform high rate from the center of the screen along a radius thereof, and then snapped back in preparation for the next sweep, means usually being provided for blacking out the return trace. The radius along which the above action occurs is given a progressive, relatively slow, rotation about the center of the screen at a speed synchronized with the scanning rotation of the antenna, and if the intensity of the luminous spot at each point is governed by the energy reflected to the radar receiver from external objects scanned by the antenna, the result will be the polar map referred to above. Since the rate of rotation of the antenna is limited by mechanical considerations to a relatively low value (for example, of the order of one to twenty revolutions per minute), a long persistence screen is required on the cathode ray tube; also, in order for the resolving power of the system to be adequate, it is essential that the sweep rate which deflects the spot along its radial paths be large compared to the rotational speed, so that there are a large number of radial excursions for each rotation of the antenna.

The manner of producing the required slow rotation of the radial trace described above, as is well known, consists in applying to the horizontal and vertical deflecting electrodes of the display tube a pair of sinusoidally varying voltages which are equal in maximum amplitude but differ in phase from one another by ninety degrees, and the modulation of these voltages simultaneously by the linear sweep described above produces the desired spoke-like pattern on the display tube.

The usual method for obtaining sinusoidal variations in the sweep voltage which accomplishes the radial trace involves feeding the sweep voltage into the primary of a two-secondary rotary transformer whose primary is rotated in synchronism with the rotation of the scanning antenna, the envelopes of the output voltages from the respective transformer secondaries being ninety degrees out of phase, and thus capable of producing circular excursions of the luminous spot when connected to the horizontal and vertical deflecting coils of a magnetically deflected cathode ray tube. Since the rotary transformer is located generally on the shaft of the scanning antenna, while the sweep frequency generator is located at a relatively remote point, such as in the chassis assembly of the set, this arrangement has necessitated the use of relatively long coaxial transmission lines to carry the sweep voltage to and from the rotary transformer.

In accordance with our invention, we obtain the sinusoidally varying voltages required for the production of such a pattern directly from the voltages generated by the known type of two-secondary rotary transformer excited by the standard power supply frequency, without passing the voltages so generated through any subsequent inductive circuits which might cause distortion in the wave forms thereof and consequently in the pattern displayed. Moreover, our invention permits the use of a cathode ray tube of the electrostatically deflected type, rather than the type requiring bulky magnetic yokes and coils about the neck of the tube, so that the size and weight of the tube unit can be greatly reduced.

The above and other objects and advantages of our invention, and a preferred manner of carrying the same into effect, will best be understood from the following detailed specification of a preferred embodiment thereof, taken in connection with the accompanying drawing, in which Fig. 1 is a schematic circuit diagram of the invention, Fig. 2 is a diagrammatic representation of the voltage supply of the equipment.

Fig. 3 is a view similar to Fig. 2 but illustrating the wave form at the output of a secondary winding of the rotary transformer, Fig. 4 is a similar view of the wave form resulting from combining the voltages of Figs. 2 and 3, Fig. 5 is a wave form diagram of the voltage applied to one pair of deflecting plates, and Fig. 6 is a similar view of the wave form applied to the other pair of deflecting plates.

Referring now to Fig. 1 of the drawing, which is a schematic diagram of the invention, numeral 10 designates the primary coil of a rotary transformer, to the terminals 12, 14 of which is applied the usual supply voltage, for example a 115 volt supply $E_1$ having a frequency of from 400 to 1600 cycles per second, as is common in aircraft. The rotatable scanning antenna of the radar system is indicated diagrammatically at 16, and the synchronous rotation of this antenna and the transformer primary is indicated by a dash line connecting the arrows showing the rotations of these elements. The two secondary coils of the rotary transformer are designated 18 and 20, these being placed 90° apart with respect to the axis of the primary coil.

In accordance with our invention, one side of each of the secondary coils 18 and 20 is connected electrically with one terminal of the supply voltage, as at 22, the other supply terminal 14 being grounded. A voltage divider 24 is connected across secondary coil 18, and a similar voltage divider 26 is connected across secondary 20, the tap point on each being so located as to tap off a voltage $E_2$ from each secondary which is slightly less than the value of the primary supply voltage. With respect to ground potential, therefore, the output voltages from each of the tap points of the voltage dividers are constituted by the sum of the supply voltage and the voltage generated in the respective transformer secondaries. This will be clarified by an inspection of Figs. 2 to 5 inclusive, Fig. 2 indicating the steady alternating supply voltage of magnitude $E_1$, and Fig. 3 indicating the voltage $E_2$ tapped off from one of the secondaries. During one half of each rotation of the transformer primary, the secondary voltage is in phase with the primary voltage, and of course varies sinusoidally in amplitude at the rotation frequency. During the second half of each rotation of the primary, the secondary voltage is 180° out of phase with the primary voltage, as indicated in Fig. 3. The sum of these voltages, which represents the voltage to ground at each of the tap points of the secondaries, is shown in Fig. 4 as a sinusoidally varying alternating voltage whose amplitude varies from a maxium of $E_1$ plus $E_2$ to a minimum of slightly above zero.

The circuit diagram of Fig. 1 is substantially symmetrical, insofar as concerns the treatment of the two voltages generated as above, so that it is necessary to describe in detail only the manner of treatment of one of these voltages, for example, that generated by the upper secondary coil 18 in series with the supply voltage; the components and connections relating to the other of these composite voltages being designated by the same reference numerals with the addition of a prime. The composite voltage $E_1$ plus $E_2$ provided by the upper secondary coil 18 is rectified by a diode 28 or other form of rectifier, and the rectified current is filtered by a network comprising a condenser 30 and resistor 32, the lower end of each being tied to ground. The rectified and filtered output obtained has a magnitude slightly less than the sum of the supply and secondary voltages, and varies sinusoidally with rotation of the transformer primary, and hence likewise with rotation of the antenna 16. This varying direct current voltage is applied across a network comprising a resistor 34 and a capacitor 36, and the voltage across the latter is normally maintained at a constant reference level equal to the magnitude of the supply voltage $E_1$, by a clamper circuit or direct-current restorer of a form known per se, here shown as comprising a pair of triodes 38, 40 connected plate-to-cathode. The plate of triode 38 is supplied with a positive direct-current plate voltage at point 42, and its grid is connected to the grid of triode 40, both of these latter grids being connected through a resistor 44 to the cathode of triode 40. The cathode of triode 40 is connected to ground through a parallel resistor 46 and capacitor 48.

The common connection 50 between resistor 34 and capacitor 36 is connected to the common point between the cathode of triode 38 and the anode of triode 40 in the usual manner of clamping circuits, the result being that so long as triodes 38 and 40 are not biassed beyond cut-off, the voltage of point 50 is clamped at a reference level $E_1$ equal to the supply voltage magnitude. The action of such a clamping or "direct-current restorer" arrangement is well understood in the art, and may be briefly explained by the fact that any tendency for the voltage at point 50 to rise would result in an increase in the grid bias of triode 38, which effectively increases the resistance of the latter, causing the plate voltage of triode 40 to return to the reference level. Likewise, a tendency for the voltage at point 50 to fall, decreases the grid bias of triode 38, which effectively decreases the resistance of this tube, and drives the voltage of the plate of triode 40 to the reference level. In other words, triodes 38 and 40, while conducting, may be looked upon as forming a voltage divider network, triode 38 operating as a variable resistor which automatically controls the portion of the plate voltage applied at point 42 which appears across the triode 40.

The above description applies equally well to the circuit elements shown as clamping the voltage at point 50' at the desired reference level $E_1$ with respect to ground potential. In order to provide the saw-tooth sweep voltages desired for the operation of the cathode ray display tube 52, the stabilizing action of the two clamping circuits may be removed intermittently by the application of a brief negative pulse to the grids of triodes 38, 40, 38' and 40', as by a gating pulse applied at point 54 and passing to the grids through a coupling condenser 56. The magnitude of this pulse is chosen so as to be capable of biassing all of the clamping circuits triodes momentarily beyond their cut-off points, and at such time the capacitor 36 either charges or discharges through the resistor 34, depending upon whether the voltage at the output of filter 30, 32 is greater or less than the capacitor voltage. This charging or discharging of capacitor 36 produces the saw-tooth sweep voltage of sinusoidally varying amplitude shown in the diagram of Fig. 5, and said sweep voltage is applied to (say) a vertical deflecting plate 58 of the cathode ray display tube 52, the opposite plate 58' being grounded.

A similar sweep voltage, shown in Fig. 6 as being 90° out of phase with the sweep above described, is provided by the symmetrical circuit arrangement connected to the secondary coil 20, and is applied to a horizontal deflecting plate 60 of the tube 52, the opposite plate 60' again being grounded. The result of the combination of sweep voltages applied is to cause the cathode ray spot to execute radial sweeps on the tube screen, the azimuth of the radius constantly changing in synchronism with the rotation of the search antenna 16.

The reason for tapping off from each secondary winding of the transformer a voltage which is preferably slightly less than, rather than equal to, the supply voltage, is that the rectifier voltage must always have positive value with respect to ground. Should the secondary voltage be greater than the supply voltage an aximuth error would be introduced at the point where no positive voltage is available to cause the rectifier to conduct.

We have illustrated the above principles in connection with the use of half-wave rectification of the wave from each of the transformer secondary windings, but it is obvious that full-wave rectification could be employed if desired. Such a modification would produce an envelope of the kind shown in Fig. 5. However, since there would be twice as many peaks as shown in Fig. 5, there would be less discharge of the filter capacitor 30 between peaks of the supply voltage.

Our invention has been disclosed herein with respect to a preferred embodiment as shown in the drawing, but it is intended to include within our invention all such changes and modifications of the disclosed system as fall within the scope of the appended claims.

We claim:

1. A plan position indicator voltage supply circuit for use with a radar system of the type utilizing a rotary antenna, comprising a transformer having a primary winding adapted for rotation in accordance with rotational movement of such an antenna, a pair of secondary windings displaced ninety degrees from one another with respect to said primary winding, means for deriving from each of said secondary windings a sinusoidally varying voltage of predetermined maximum amplitude, one side of each secondary winding being connected to the same side of the primary winding, means for rectifying the voltages derived from each secondary winding and applying the same to respective sweep-circuit capacitors, means for maintaining the voltage across each capacitor substantially constant, means for intermittently disabling said last named means to develop a sweep voltage variation across each capacitor, and means for connecting said sweep voltages respectively to orthogonally opposed deflecting electrodes of a cathode ray tube.

2. A plan position indicator voltage supply circuit comprising a rotary transformer having a rotatable primary winding, a pair of secondary windings displaced ninety degrees from one another with respect to said primary winding and each having one terminal connected to the same terminal of said primary winding, means for deriving from each secondary winding a voltage whose amplitude varies sinusoidally with rotation of said primary winding, means for summating each of the respective secondary voltages so derived, and the primary voltage, to provide a pair of control voltages each having an amplitude envelope varying sinusoidally at the rotation frequency of said primary winding and 90° out of phase with one another, and means for rectifying and smoothing said control voltages to provide a pair of slowly varying direct current voltages, a resistor-capacitor network fed by each of said voltages, control means for maintaining the voltage across each capacitor at a predetermined reference level, and means for intermittently disabling said control means to provide a sweep voltage variation across each of said capacitors.

3. A scanning sweep system for cathode ray tubes of the type having orthogonally disposed sets of beam deflecting electrodes, comprising a source of alternating voltage, means for deriving from said source a pair of equal alternating voltages in quadrature with one another whose amplitudes vary in a sinusoidal manner and whose maximum amplitude does not exceed the amplitude of said source, means for adding said derived voltages respectively to said source voltage, means for rectifying the resultant additive voltages to provide a pair of direct current voltages whose amplitude envelopes vary in a sinusoidal manner, and circuit elements comprising a condenser for shaping the direct current pulsations to sawtooth form.

4. A scanning sweep system for cathode ray tubes of the type having orthogonally disposed sets of beam deflecting electrodes, comprising means for generating an alternating voltage whose amplitude envelope varies sinusoidally with time at a rate less than the alternation frequency, rectifier means for converting said voltage to a direct current voltage whose amplitude varies at said rate, a circuit comprising a resistor and a capacitor in series across said direct current voltage, means for normally maintaining the component of voltage across said capacitor at a fixed value, means for periodically disabling said last-named means to provide a linear sweep voltage across said capacitor, and means for applying said sweep voltage to one set of said electrodes.

5. In a scanning sweep system for cathode ray tubes of the type having orthogonally disposed sets of beam deflecting electrodes, a voltage source comprising a transformer having a primary winding adapted for rotation and a pair of secondary windings displaced ninety degrees from one another with respect to said primary winding, means for deriving from said secondary windings a pair of equal alternating voltages in quadrature with one another whose amplitudes vary in a sinusoidal manner and whose maximum amplitude does not exceed the amplitude of the voltage of said primary, means for adding said derived voltages respectively to said primary voltage, means for rectifying the resultant additive voltages to provide a pair of direct current voltages whose amplitude envelopes vary in a sinusoidal manner, and a condenser for shaping the direct current pulsations to saw-tooth form.

References Cited in the file of this patent
UNITED STATES PATENTS

| | | |
|---|---|---|
| 2,258,752 | Fewings et al. | Oct. 14, 1941 |
| 2,275,974 | Mathes | Mar. 10, 1942 |
| 2,313,966 | Poch | Mar. 16, 1943 |
| 2,400,791 | Tolson | May 21, 1946 |
| 2,409,456 | Tolson | Oct. 15, 1946 |
| 2,412,291 | Schade | Dec. 10, 1946 |
| 2,421,747 | Engelhardt | June 10, 1947 |
| 2,464,822 | Mallett | Mar. 22, 1949 |
| 2,471,516 | Bryant | May 31, 1949 |